Vernon B. Scott
INVENTOR.

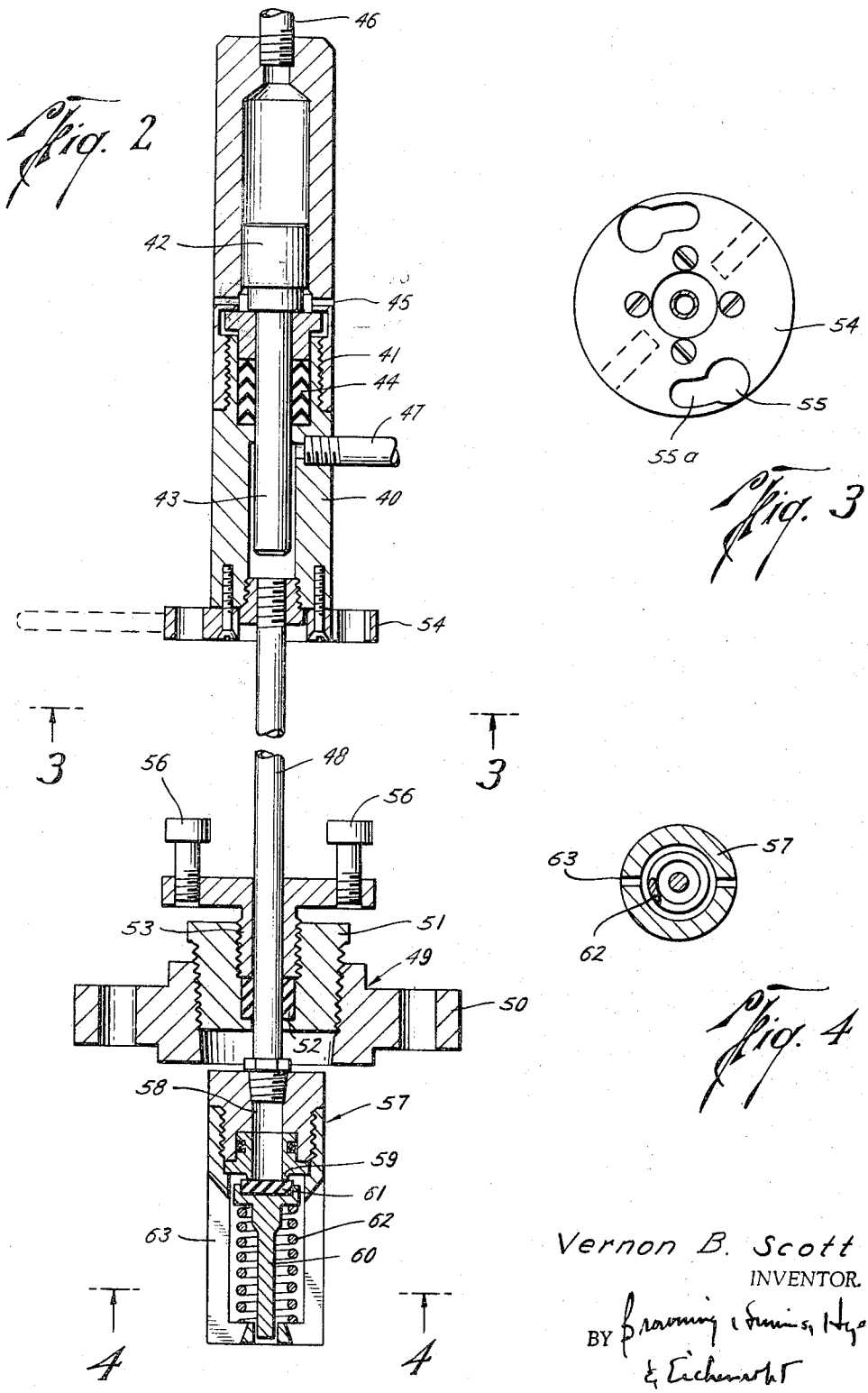

United States Patent Office 3,303,699
Patented Feb. 14, 1967

3,303,699
PROCESS FOR DETERMINING RATE OF FLOW
OF GAS THROUGH PIPELINES
Vernon B. Scott, P.O. Box 13447,
Houston, Tex. 77019
Filed Apr. 30, 1964, Ser. No. 363,735
8 Claims. (Cl. 73—194)

This invention relates to a process for determining the rate of flow of gas through pipelines and other conduits through the use of a detectable tracer gas.

Measurement of the rate of flow of natural gas through pipelines with accuracy and reproducible results has presented many problems to those engaged in the business of gathering and transporting natural gas. At present, it is standard commercial practice, and almost universally so, to use orifice meter installations for flow measurement. This type of measurement is subject to several disadvantages. In the first place, orifice meter installations, particularly for larger transmission lines, e.g., 30 inch, are very expensive and in some cases, they cost in excess of $100,000 per installation. Second, the orifice meter measurement involves a calculation based upon the assumption that there is a fixed relationship between the pressure differential across an orifice and the quantity or rate of flow of gas through the pipeline over a given time interval. Since this relationship can and does vary, it is not always possible to calculate the absolute rate of flow of gas passing through the line with an accuracy of 1 percent or less. An appreciable surging of the flow of gas through the pipeline and orifice also reduces the measurement accuracy and in some cases where the surging is sufficiently severe, surging prevents orifice measurement with any degree of acceptable accuracy. Moreover, any given size orifice plate in any given size pipeline has a range of flow rates which it can accommodate and for flows outside this range, it is necessary to change the orifice plate size.

It is therefore a primary object of this invention to provide an improved process for making gas flow measurements by tracer gas techniques involving a relatively economical installation of equipment and yet yielding results of a high order of accuracy.

Another object is to provide such a process which can effectively measure flow rates varying over a broad range without necessitating changes in equipment and the like as required in the orifice type of measurement.

Another object is to provide such a method which can accommodate transient or pulsating flow conditions and yet provide an acceptable degree of accuracy.

Another object is to provide such a process wherein the true flight time of a tracer gas from its point of injection to its point of sampling can be determined accurately despite lag time in the injection apparatus and despite lag time in the sampling and detection apparatus used to provide a signal for timing the arrival of the tracer gas at the point of sampling.

Another object is to provide such a process in which the true flight time of an injected tracer gas from one point to another can be determined despite lag time in the injection apparatus between the time of indicated injection and the actual time of injection or despite fluctuations in such lag time from injection to injection.

Other objects, advantages and features of the invention will be apparent to one skilled in the art upon a consideration of the specification, claims and the attached drawings wherein:

FIG. 2 is a view, partially in elevation, of an apparatus for injecting a tracer material into a pipeline or other conduit;

FIGS. 3 and 4 are views taken on the lines 3—3 and 4—4 of FIG. 2; and

Figure 5:
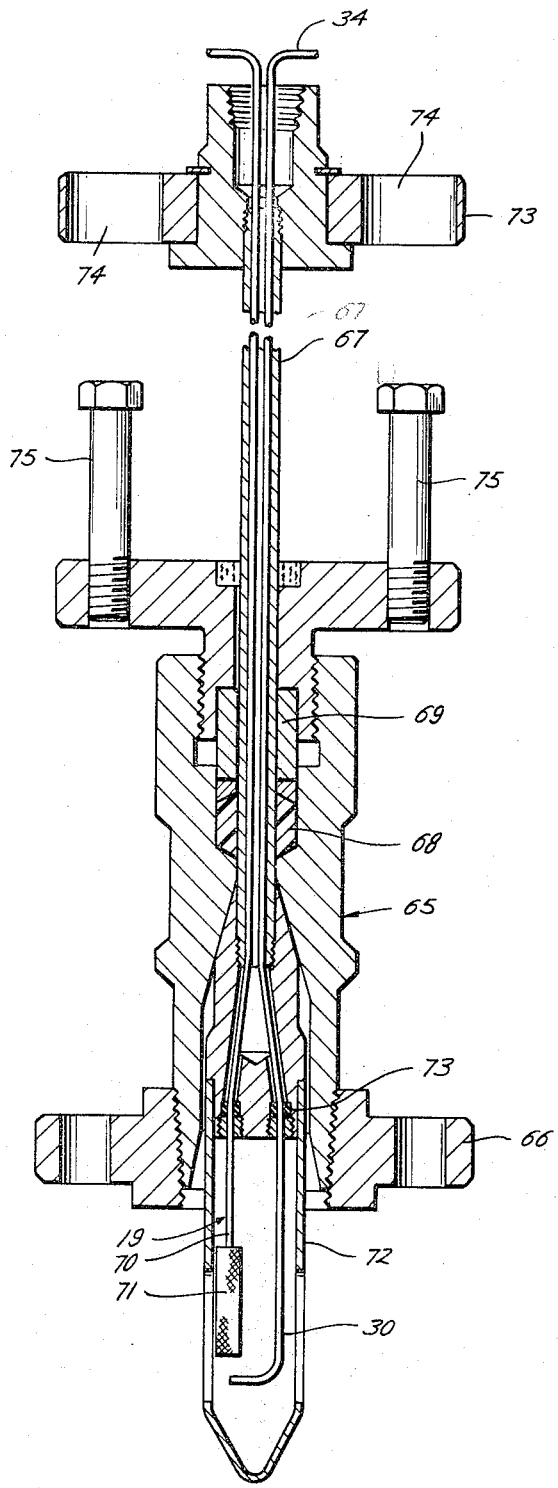

FIG. 5 is a vertical cross sectional view of an apparatus for sampling a gas stream flowing through a pipeline.

Like reference characters will be used on like parts throughout the several views.

Figure 1:
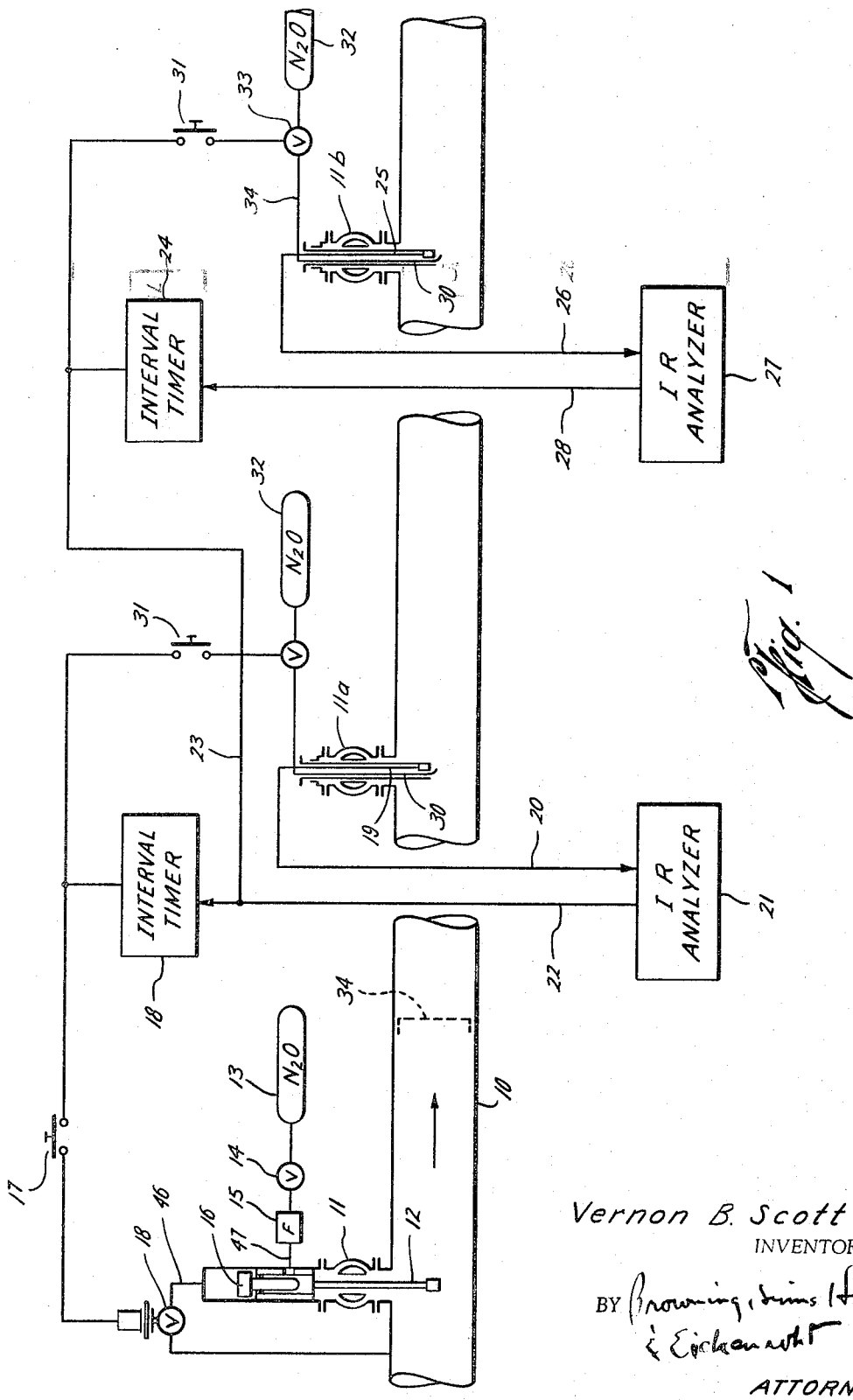
FIG. 1 is a diagrammatic illustration of one arrangement of apparatus adapted to practice the process of this invention.

Before discussing in detail the steps and operating parameters of the process, an installation of equipment suitable for practicing the process will be described. Referring to FIG. 1, there is shown a pipeline 10 having three side outlets on which are mounted tapping valves 11, 11a and 11b. Mounted on tapping valve 11 is a tracer injection mechanism which will be described in greater detail below. This injection mechanism has a retractable injection probe 12 through which the tracer material is injected into the pipeline. The tracer material can be contained in a bottle 13 connected to the injection apparatus via a check valve 14 and a filter 15. The injection apparatus includes a differential area piston 16 which, upon downward movement, causes a small quantity of the tracer material to be injected into the pipeline. Normally the piston, shown in its lower position, is in an upper position so that when switch 17 is closed, solenoid valve 18 opens to transmit line pressure from the pipeline to the upper side of the piston forcing it downwardly which in turn causes a small quantity of the tracer material to be injected. Backflow of tracer material into bottle 13 is prevented by check valve 14. Closing of switch 17 also starts interval timer 18. As the injected tracer material is moved along the pipeline with the gas flowing therein, it will eventually reach sampling probe 19. A small amount of gas in the pipeline containing the tracer material flows through the probe and the conduit 20 to an analyzer 21 capable of detecting the presence of the tracer material. This analyzer then sends the signal via conductor 22 to timer 18 to either stop it or otherwise read out the time interval between the closure of switch 17 and arrival of the detection signal at the timer, thereby giving an "apparent" flight time which will be defined below. The same detection signal is fed via conductor 23 to another interval timer 24 to cause it to begin timing. Then as the tracer material is carried by the gas to a second sampling probe 25, a portion of it will flow through conduit 26 to a second analyzer 27 which in turn sends out a signal via conductor 28 to timer 24 to cause it to either stop or otherwise read out the time interval between the two detection signals. This time interval can be either another "apparent" flight time of the tracer material between the two sampling points or an "actual" flight time, as discussed below.

Thus it will be seen that the time recorded or read out by interval timer 18 begins with the closing of switch 17 and stops upon receipt of a signal from analyzer 21. This time interval includes two primary lag times. The first is the time it takes for valve 18 to operate and for piston 16 to descend and push the tracer material out into the pipeline. The second lag time is the time required for the gas and tracer material to flow through sampling probe 19 and through the analyzer plus the lag time of the analyzer. The "true" flight time is the actual time for the tracer material to move from its point of injection along the pipeline to its point of sampling. Therefore, the "apparent" flight time is the true flight time plus the two lag times mentioned above.

There are a number of methods by which the two lag times can be determined in order that they can be subtracted from the "apparent" flight time to arrive at the "true" flight time. If the geometry (sampling and injection conduit size, length, etc.) is known, it is possible to calculate the two lag times. For example, the time required for valve 18 to open after it receives the signal can be measured as can the time for piston 16 to descend after pressure has been exerted on it. Then by calculating the time required for the pressure gas from the pipeline 10 to flow to the top of piston 16 and adding in the lag times of the valve and piston, the lag time for tracer material injection can be determined. Similarly, by calculating the time required for the gas sample to flow through the sampling probe 19, conduit 20 and the analyzer and adding the lag time of the analyzer, the sampling lag time can be determined.

Another method for determining the sampling lag time is to inject tracer material at a point closely adjacent the intake to sampling probe 19. For example, an injector 30 can be positioned as shown, so that upon closing of switch 31, valve 33 is opend to permit tracer material to flow from source 32 through conduit 34 into injector 30. Closing of switch 31 starts interval timer 18 which will be stopped upon receipt of a signal from analyzer 21. Therefore, the time interval recorded is the time required for the tracer material to flow through the sampling probe 19, conduit 20 and the lag time of the analyzer 21, plus the time required for the tracer material to flow into the pipeline through injector 30. The latter time can be calculated using the size of conduit 34 and the injector 30. Desirably, the length of conduit 34 is made very short, the internal diameters of conduit 34 and injector 30 are made quite small and the pressure at which the tracer material is maintained in container 32 is quite high. All of these factors reduce the time for injection to a very small interval, so that any inaccuracies in calculations will have correspondingly small effect upon the measured lag time.

The sampling lag time of the second downstream sampling system at tapping valve 11b can be determined in a like manner and hence the tracer injection system has been given like numbers.

Where extreme accuracy is desired, it is preferred to use two sampling systems. Under this arrangement, the arrival of the tracer material at probe 19 and a subsequent detection by analyzer 21 causes the latter to trigger interval timer 24 via a signal through conductor 23 to start the timer. Subsequent arrival of the tracer material at sampling probe 25 and a subsequent detection by analyzer 27 causes a signal to be sent via conductor 28 to stop interval timer 24. Then by making the geometry of the two sampling systems exactly the same and by matching the analyzers 21 and 27 so that they have the same lag time, the lag times of the two systems are equal and therefore cancel each other out. Accordingly, timer 24 will reflect the true flight time of the tracer material from a point in the pipeline even with the lower end of sampling probe 19 to another point even with the lower end of sampling probe 25.

Instead of making the geometry of the two sampling systems the same and matching the analyzers with respect to lag times, it may be possible in some instances to calculate the time for a sample to flow from the inlet of the sampling probe through the analyzer for each sampling system. The lag time of the analyzers can also be determined by injecting gas containing a tracer material into them through a very short connection and then determining the response time of the respective analyzers. The difference in over-all flight time between the two systems can then be used as a correction factor to correct the time read out on the interval timer.

It will thus be seen by using the dual sampling systems, interval timer 18 can be eliminated and any errors in calculating or otherwise determining the lag time in the injection system become inconsequential.

Regardless of whether a single sampling system or a dual sampling system is used, it will be seen that by knowing the distance between the injection point and a sampling point for the signal sampling system or the distance between the two sampling points of the dual sampling system, and the respective time intervals, the velocity of gas through the pipeline and hence the rate of flow can be readily calculated. Alternatively, the respective interval timer for any given installation can be calibrated in terms of rate of flow of gas through the pipeline so that there is a direct readout.

When extreme accuracy is required and instead of using two sampling systems as a part of the permanent installation, it is preferred to use the downstream or second sampling system only for calibration purposes. Thus by locating the first sampling point a known distance downstream from the injection point and by locating the second sampling point an equal distance downstream from the first sampling point, the true flight time between the two sampling points can be determined as described above and this time should be equal to the true flight time between the injection point and the first sampling point. Therefore, the apparent flight time between the latter two points can be corrected by using the true flight time. For example, if the true flight time is 21 seconds, and the apparent flight time (including lag times) between the injection point and the first sampling point is 22 seconds, it is apparent that the lag time is 1 second. This can either be subtracted from the timer reading or the correction factor can be inserted into the timer so that the reading reflects the true flight time. Then after the calibration has been made, the injection probe 25, analyzer 27, and timer 24 can be removed for calibration of other metering installations.

While it is preferred that the distances between the injection point and first sampling point and between the first and second sampling point be equal, it is possible to use unequal distances and to correct the measured flight times to compensate in the differences in distances.

In order for the process to function accurately, the timed interval or measured true flight time must have a fixed known relationship with respect to the average velocity of the gas across any given cross-section of the pipeline. This in turn means that the injected tracer material's position with respect to the gas which is carrying it through the pipeline must likewise have a fixed known relationship to the average velocity of the gas across any given cross-section. To accomplish this, there are a number of factors which must be controlled.

In the first place, it has been found that the gas must be flowed through the pipeline at a velocity or rate such that the Reynolds number thereof exceeds $1.5 \times 10^4$. Preferably the Reynolds number will be in the range of about $2.4 \times 10^6$ to $4.6 \times 10^7$. With the gas flowing in this highly turbulent state, it has been found that certain selected tracer materials as described below will maintain a substantially flat wave front, as indicated at 34, as they are moved through the pipeline. It has also been found that the molecules of the tracer material do not migrate or diffuse through the gas longitudinally of the pipeline sufficiently to significantly reduce the accuracy of the time measurement. Thus the tracer material is moved as a "plug" through the pipeline at a velocity that is equal to the average gas velocity across a section of the pipeline. This is true even though the tracer materials are injected at a single point at the center of the pipeline. In this connection, it is preferred that only a very small amount of tracer material be injected into the pipeline and it should be injected at a very rapid rate. It has been found that the rate of injection should be such that a detectable amount is injected in a time equal to or less than the desired accuracy of measurement of flight time or flow rate. For example, if an accuracy of 1% of flight time (and hence an accuracy of 1% of flow measurement) is desired, the injection time should be 1% or less of the true flight time. In this connection, it is not necessary that all the tracer material be injected within this time limitation but only that a detectable amount of it be so injected. This is true because the sampling and detector systems are sensitive to the arrival of the wave front of tracer material and as long as this wave front contains a detectable amount of material within the time limitation expressed above, the amount of tracer material lying behind the wave front becomes inconsequential.

The selection of the particular tracer material used is important. In this first place, it should have a molecular weight or density of at least twice that of the gas into which it is injected under the conditions existing in a pipeline. This relatively high molecular weight or density seems to limit the amount of diffusion of the detector material through the gas longitudinally of the pipeline. Second, the tracer material should, of course, be such as to be detectable by the particular analyzer employed. Third, it should be gaseous under the conditions existing in the pipeline. It is preferred that the tracer material be in a liquid form while in container 13 so that in turn, it will be injected into the pipeline as a liquid thereby permitting very rapid injection of any given amount of material. Of course, as soon as it is injected, it evaporates into a gaseous form. In this connection, the temperature of the liquid in container 13 should be maintained high enough so that the pressure in the container not only exceeds the pipeline pressure but is sufficient to maintain the tracer material as a liquid in the connecting conduits and in the injection probe itself. In this manner, the amount of tracer material injected each time can be maintained substantially constant. Suitable heating jackets can be placed around the containers to maintain liquid temperature at or greater than the temperature of the gas stream in the pipeline. Fourth, the tracer material should be inert with respect to the substances within the pipeline. Thus, if the tracer material is reactable or absorbable by the gas, water or other materials which might be in a pipeline, it will tend to be absorbed or reacted which will distort or possibly even eliminate the wave front 34.

A preferred tracer material is nitrous oxide. There are a number of reasons for this preference. First, it is a man-made product and does not occur naturally in nature. Therefore, naturally occurring contaminants in the pipeline cannot falsely trigger the sampling and detecting systems. Second, its molecular weight and density are high enough relative to natural gas that it gives an excellent wave front. Thirdly, it is inert to all substances normally found in natural gas pipelines. Fourthly, it is readily vaporized even under the high pressure conditions of the pipeline. Of course, other materials can be used as long as they meet the above qualifications. Among these may be found acetylene, 1, 2-dichloroethane, dichlorodifluoromethane (commonly sold under the trade name "Freon 12"), etc. A suitable analyzer for nitrous oxide is an infrared analyzer. Of course, a suitable analyzer will have to be chosen for the particular tracer material employed. Such choice can be readily made by those skilled in the art from infrared analyzers, chromatographs, etc.

Details of one preferred type of tracer material injector probe are shown in FIG. 2 wherein the reference numeral 40 designates a body, preferably constructed in two parts joined by threads at 41. The body 40 contains a piston 42 and a piston 43 of a relatively smaller size with the latter sliding through packing 44.

A vent 45 provided in the upper part of the body above the packing 44 but below piston 42 so that the lower side of this piston is always exposed to atmospheric pressure. Also, the gas under pressure introduced by conduit 46, after driving piston 42 downward rapidly, escapes to the outside atmosphere by leaking around piston 42 and passing through the vent 45. Conduit 47, which is connected to a source of tracer material, communicates with the body 40 below packing 44. The cylinder in which piston 43 operates, communicates with a pipe 48 which extends slidably through a closure member designated generally as 49. The closure member 49 includes a flange 50 adapted to be bolted to the upper flange of the tapping valve as shown in FIG. 1. Flange 50 is threaded to receive a tapered threaded plug 51. Plug 51 contains seal 52, preferably constructed of "Teflon" (polytetrafluoroethylene) held in place by a threaded retaining member 53 which compresses the seal tightly about pipe 44.

Body 40 carries an attachment flange 54, shown in plan in FIG. 3, at its lower end. The openings 55 in this flange have a substantially circular portion large enough to pass the heads of studs 56 carried by retaining member 53 and a narrower section 55a extending therefrom so that when pipe 48 is moved downward through the closure member 49, the heads of studs 56 pass through openings 55 and the flange 54 is then rotated to bring the stud heads over the narrower slotted portions 55a. The studs may then be tightened to hold flange 54 and body 40 in place.

The length of pipe 48 is selected so that the valve cage 57 will be located substantially at the central axis of pipeline 10 when body 40 has been locked in place by the studs. Cage 57 is illustrated as including a central bore 48 therethrough forming a continuation of the bore pipe 48. An annular valve seal 59 is provided around the bore at its lower end.

A suitable check valve is provided and is illustrated as comprising a valve stem 60 carrying a valve element 61 which is preferably constructed of "KUF" (trifluoromonochloro polyethylene) and which is carried by the valve stem to seat upon valve seat 59. A resilient member illustrated as a spring 62 is disposed to urge the valve member constantly toward seated position. Cage 57 has openings 63 therein communicating between the interior of cage 57 and the interior of the pipeline outside the cage.

The operation can be described as follows. The device is bolted to the tapping valve and the latter opened. The pipe 48 is then pushed downwardly until stud heads 56 extend through openings 55 at which body 40 is turned to be locked in place. The source of tracer material, which is under pressure, is connected via conduit 47, to the injection mechanism. The pressure of this material pushes pistons 42 and 43 upwardly but is insufficient to open the check valve in cage 57. Then when switch 17 is momentarily closed, valve 18 in conduit 46 is opened. Full pipeline pressure is then applied to the upper side of the piston 42 and the piston is driven downward. Since the smaller cylinder 43 and pipe 48 are at all times filled with tracer material introduced through line 47, and this material is prevented from being driven backward to its source by check valve 14, downward movement of piston 43 increases the pressure upon valve element 64 and unseats it. As a result, a volume of tracer material equivalent to the volume of piston 43 which is moved into the cylinder below packing 44 is expelled into the pipeline.

One form of a sampling device is illustrated in FIG. 5. It includes a body 65 having a flange 66 on the lower end thereof adapted to be bolted to the upper flange of a tapping valve. The sampling probe 19 is disposed inside of a pipe 67 which in turn is slidably disposed through body 65 and is sealed therefrom by a suitable packing 68 (preferably "Teflon") held in position by a bushing 69, preferably of brass. The sampling probe comprises a small diameter conduit 70 and a pressure snubber 71, the latter being made of a porous material as of metal or plastic and serving to take substantially all of the pressure drop between the analyzer and the pipeline. Conduit 70 should be made as small as possible so that the gas sample will flow therethrough at a high velocity and hence reduce lag time. The lower end of the sampling probe can be disposed in a protective sleeve 72 and sealed by a seal 73 to prevent escape of pipeline gas to the atmosphere.

The upper end of the pipe 67 carries an attachment flange 73 which has a pair of openings 74 in it shaped like the openings 55–55a in FIG. 3. Thus the attachment flange can be locked to the studs 75 in the same manner as flange 54 is locked to studs 56 in FIG. 2.

As indicated above, it is possible to inject a tracer material into the pipeline immediately adjacent the inlet end of the sampling probe 19. As illustrated in FIG. 5, conduit 34 extends through pipe 67 to terminate as injector 30 which discharges tracer material immediately below pressure snubber 81.

The operation of the sampling probe from a mechanical sense as far as the insertion is concerned is the same as the injection probe of FIG. 2 and will not need to be further described.

From the foregoing, it will be seen that this invention is one well adapted to attain all of the ends and objects hereinabove set forth, together with other advantages which are obvious and which are inherent to the process and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limited sense.

I claim:

1. A process for determining the rate of flow of gas through a pipeline or other conduit comprising the steps of: flowing the gas through the pipeline at a rate such that the Reynolds number exceeds $1.5 \times 10^4$; injecting a small amount of tracer material into the pipeline, said material comprising a detectable material which is gaseous under the conditions existing in the pipeline, is inert wth respect to other substances in the pipeline and has a molecular weight of at least twice that of said gas; detecting the arrival of the injected tracer material at each of two points spaced a known distance apart longitudinally along the pipeline downstream of the point of injection of the tracer material; determining the actual flight time of the injected tracer material between said two points by measuring the elapsed time between detection of arrival at the first point and the detection of arrival at the second point, measuring the apparent flight time of the tracer material from its point of injection to at least one of said points and comparing said apparent flight time with said actual time, taking into account respective flight distances involved, to obtain an actual flight time between said point of injection and at least one of said two points.

2. The process of claim 1 wherein the distance between the two points is equal to the distance between the injection point and one of said two points.

3. The process of claim 2 wherein detection systems used to detect the arrival of the tracer material at said two points have lag times equal to each other.

4. The process of claim 3 wherein said detector material is nitrous oxide.

5. A process for determining the rate of flow of gas through a pipeline or other conduit comprising the steps of: flowing gas through the pipeline at a rate such that the Reynolds number exceeds $1.5 \times 10^4$; injecting a small amount of tracer material into the pipeline at one point, said material comprising a detectable material which is gaseous under the conditions exsting in the pipeline, is inert with respect to other substances in the pipeline and has a molecular weight of at least twice that of said gas; establishing two detection systems for (a) sensing the arrival of the injected tracer material at first and second points which are at different distances from the injection point to produce first and second detection signals respectively and (b) measuring the elapsed times between the injection of the tracer material and the first detection signal and between said first and second detection signals, said systems having lag times between the arrival of the tracer material at said points and the measurement of said elapsed times of fixed relationship to each other; employing said detection systems to measure the apparent flight time of the injected tracer material from its injection point to one of said first and second points and also the actual flight time between said first and second points; and correcting the apparent flight time to an actual flight time by taking into account the lag time of the detection system measuring the flight time from the injection point.

6. A process for determining the rate of flow of gas through a pipeline or other conduit comprising the steps of: flowing gas through the pipeline at a rate such that the Reynolds number exceeds $1.5 \times 10^4$; injecting a small amount of tracer material into the pipeline, said material comprising a detectable material which is gaseous under the conditions in the pipeline, is inert with respect to other substances in the pipeline and has a molecular weight of at least twice that of said gas; measuring the apparent flight time of the injected tracer material from the point of injection to a first detection point a known distance downstream of said injection point by using a first detection and timing system which has a lag time between the instant the tracer material actually arrives at said first point and the instant the first detection and timing system indicates such arrival; measuring the flight time of the tracer material from said first detection point to a second detection point a known distance from the first detection point by using a second detection and timing system which also has a lag time, and comparing the last mentioned flight time to said apparent flight time to determine the lag time of the first detection and timing system; and using this lag time to correct the apparent flight time to an actual flight time.

7. The process of claim 6 wherein the first and second detection and timing systems have lag times equal to each other and the distance between the injection point and the first detection point is equal to that between the first and second detection points so that the measured flight time between the first and second detection points is the actual flight time and subtracting this actual flight time form the apparent flight time from the injection point to the first detection point to determine the lag time of the first detection and timing system.

8. The process of claim 7 wherein the tracer material is nitrous oxide.

References Cited by the Examiner

UNITED STATES PATENTS

| 2,739,476 | 3/1956 | Atkins | 73—194 X |
| 2,829,518 | 4/1958 | Rumble et al. | 73—194 X |
| 2,932,741 | 4/1960 | McKay | 250—43.5 |

FOREIGN PATENTS

| 512,388 | 1/1955 | Italy. |

OTHER REFERENCES

Neeley: "Ohio Chemical Technical Information," Series I, "Nitrous Oxide for Leak Detection," Ohio Chemical & Surgical Equipment Co., Madison 10, Wisconsin, May 7, 1957, 7 pages.

RICHARD C. QUEISSER, *Primary Examiner.*

E. D. GILHOOLY, *Assistant Examiner.*